United States Patent [19]

Tieman et al.

[11] Patent Number: 4,758,165
[45] Date of Patent: Jul. 19, 1988

[54] TACTILE RELIEF DISPLAY DEVICE AND METHOD FOR MANUFACTURE IT

[75] Inventors: Frans J. Tieman; Kees Zeehuisen, both of Rockanje, Netherlands

[73] Assignee: F. J. Tieman B.V., Rockanje, Netherlands

[21] Appl. No.: 14,473

[22] Filed: Feb. 13, 1987

[30] Foreign Application Priority Data

Feb. 24, 1986 [NL] Netherlands ................ 8600453

[51] Int. Cl.$^4$ .......................................... G09B 21/00
[52] U.S. Cl. .................................... 434/114; 340/407
[58] Field of Search ................ 434/114, 113, 115; 340/407; 310/331, 332

[56] References Cited

U.S. PATENT DOCUMENTS

| 3,229,387 | 1/1966 | Linvill ........................... 35/35 |
| 4,044,350 | 8/1977 | Tretiakoff et al. ............. 340/407 |
| 4,283,178 | 8/1981 | Tetzlaff ........................ 434/114 |
| 4,445,871 | 5/1984 | Becker ......................... 434/114 |
| 4,473,356 | 9/1984 | Fernando et al. ............. 434/114 |
| 4,633,121 | 12/1986 | Ogawa et al. ................ 310/332 |
| 4,664,632 | 5/1987 | Tretiakoff et al. ............. 434/114 |

Primary Examiner—Richard J. Apley
Assistant Examiner—J. Welsh
Attorney, Agent, or Firm—Larson and Taylor

[57] ABSTRACT

A braille cell having piezoelectric reeds (8-11) attached at one end (28), supported in their middle region (at 29) and cooperating with tactile members (12-15) at their other end. The attachment of the reeds at their one end (28) being by soldering a protruding part of the reeds to a conducting web (32) parallel to the flexion plane of the reeds. The other ends of the reeds are then located in the desired position with respect to the tactile members.

10 Claims, 3 Drawing Sheets

TACTILE RELIEF DISPLAY DEVICE AND METHOD FOR MANUFACTURE IT

FIELD OF THE INVENTION

The invention relates to an electromechanical relief display device provided with a frame and at least one tactical member which is movable between a first position and a second position. Touching the device, a person can determine in which position the tactile member is. The tactile member is coupled to an oblong piezoelectric flexion member which may be bent under the influence of voltages applied to it and which is supported in the frame by supporting means in two locations and in a third location is coupled to the tactile member.

BACKGROUND OF THE INVENTION

Such a relief display device is known from U.S. Pat. No. 4,044,350. With this known device a number of piezoelectric flexion members, also called piezoelectric reeds, are supported at their ends and in their central part coupled to a tactile member.

This construction allows a reasonable driving force to be obtained for the tactile member. However, the excursion of the tactile member is rather small with a predetermined flexion of a flexion member of predetermined length.

Devices of the considered type are used as a blind aid for instance in braille cells or rulers or in other devices for tactually displaying a number of points as shown from U.S. Pat. No. 3,229,387.

A difficulty with these devices is that the tactile members have to be located rather near to each other. Due to this and to the fact that the flexion members extend to both sides of the textile members, it becomes difficult to find sufficient space for the flexion members. For instance, in the braille cell shown in U.S. Pat. No. 4,044,350, the members have been mounted above each other in a number equalling the number of braille points in a character (six are shown, but there may be eight in a braille system with further signalling possibilities such as musical notation).

Another braille cell having flexion members has been shown in U.S. Pat. Nos. 2,283,178 and 4,473,356. In these publications the flexion members are mounted by clamping them near to one end in a fitting neck portion. According to U.S. Pat. No. 4,283,178, the flexion member is activated by a DC voltage and in U.S. Pat. No. 4,473,356 by an AC voltage. It should be noted that with the present invention both types of excitation are possible, because if a person can sense whether the tactile member is in the first or the second position he will also be able to sense its vibrational movement between the first and the second positions.

A difficult of these two publications is, however, that the flexion members or reeds are clamped at one of their ends. This feature at the one hand allows for a considerable excursion with a certain flexion member but leads to relatively small driving forces for the tactile members.

A further disadvantage of these known devices is, that with a predetermined force to be exerted on the tactile member, a rather srong flexing momentum works at the flexion member in the immediate proximity of its clamped part.

Still a further disadvantage is that it is very difficult to have the flexion member mounted in the correct position. This is due to the fact that angular displacements of the flexion members at their clamping location are multiplied by almost the whole length of the flexion members, whereas it is not sure that all flexion members have exactly the same shape when no exciting voltage is applied to them. The above reasons necessitate an individual adjustment, for instance of the length of the tactile members, which means additional labour and a complication of the construction. Also, reed adjustment during use at times may be necessary. Individually adjusted tactile members have the further disadvantage that with cleaning, for instance in order to remove cutaneous fat, one has to see to it that the same tactile member again cooperates with the same flexion member after the tactile members have been temporarily demounted.

Finally, it is remarked that increase of the flexion excursion or the driving force for the tactile member by augmenting the applied voltage may be undesired or even forbidden in view of safety regulations.

SUMMARY OF THE INVENTION

The invention aims to overcome the above indicated disadvantages and more specifically to provide a relief display device of the indicated type enabling the combination of sufficient driving force and sufficient excursion as well as easy manufacture without adjustment.

The above aims are realized by providing that a third location is located outside the first and second locations.

With the present invention, the driving part of a flexion member is a free end. Thus, a greater excursion is obtained with a certain length and curvature of the member than in the case where the ends of the flexion members are fixed.

Furthermore, a more homogeneous distribution of forces is obtained than is possible with one-sided clamping. The well defined position between two spaced locations enables a manufacturing method without individual adjustment of the tactile members, as will be explained further on.

According to a further elaboration of the invention, it is provided that the support means of the flexion member at the said first location contains a protruding part of the said leaf. This part is attached to the frame. The support means in the second location consists of two clamping members between which the flexion member is clamped. Though generally the best results are obtained if the second location is in the middle of the flexion member, some variation is possible so that the term "middle region" encompasses a region going for instance from a quarter of the member's length from the first location to somewhat beyond the middle (because the excursion decreases quickly when the second location is located further away from the first location than from the middle).

Piezoelectric flexion members or reeds which preferably are used with the invention have a conducting central leaf, a piezoelectric layer on both sides of the central leaf, and a conducting coating on these layers. When using such a reed, it is according to a further elaboration of the invention provided that the attachment occurs at the first location by attaching the central leaf and at the second location by clamping the reed between the support members.

The attachment occurs preferably at a protruding part of the central leaf which is short in comparison to the reed's length. Such a mounting enables at the one hand to prevent displacement in the flexion plane practically completely, but on the other hand a sufficient flexibility to deal with the reed's flexion without fear for fatigue.

According to a further elaboration of the invention, it is provided that at the second location the flexion member or reed is clamped between clamping surfaces which are somewhat convex towards the reed. Because with the invention some pivot movement of the reed is possible at the location of the clamping, this way of engagement of the reed and clamping members is precise as well as flexible.

With application of the invention in a step configuration of the reeds, as per se known from U.S. Pat. Nos. 4,283,178 and 4,473,356 and wherewith the reeds have the same length, it is preferably provided that the first, second and third support locations are arranged in corresponding step configurations.

A preferred embodiment of the invention, with which the reeds may be located in step configurations above each other or not, is where the first support means for the flexion members contains a connection between one of the conductors of the flexion members and a conducting plane which is mainly parallel to the plane in which the flexion members flex.

Such a connection may be a solder connection between, for instance, the central leaf and the conducting plane, but weld connections and fixation by clamping or screwing is also possible.

With this embodiment, it is possible to eliminate the consequences of any differences in the initial flexion for curvature of the reeds.

The other conducting part can be connected to a related electrical terminal by means of, for instance, a conducting wire, soldering, welding and/or screwing.

Furthermore, this embodiment is very suitable for duplicating. By use of two sets of reeds, each set is mounted in step configuration with its reeds located above each other and the conducting surfaces with which the solder or weld connections are made being located on opposing surfaces of a plate located in the space between elongations of the reeds and parallel to the flexion plane of the reeds.

According to a further elaboration of the invention, an extremely advantageous manufacturing method of such a device is obtained by providing that the flexion members at their second locations are mounted somewhat tiltable in their flexion plane. Then, the flexion members in their third locations are positioned such that they are adjusted with respect to the tactile members and the flexion members in the first locations are then attached in this adjusted condition. Thus, it is possible to make allowance for the initial curvature of the reeds in such a way that standard tactile members will suffice practically without any adjustment.

It has appeared that compensation of the individual shape of the reeds is possibly by attaching the ends of the reeds in the first location in a position in which the reed's ends cooperating with the tactile members are rightly located.

A further advantage of a display device manufactured in this way consists in that the tactile members are small pins having a fixed length in dependence on their location in the step configuration. This fact allows for demounting and mounting without necessity that the same pin is mounted at its earlier location. Consequently, cleaning and service are eased and time and labour saved.

In this respect it is remarked that such devices in the long run pick up a certain quantity of dirt, for instance cutaneous fat. It is then common to demount such a device, for instance a braille reading ruler, and to clean the tactile members carried out as pins with rounded heads, as well as the plate with holes through which the pins may protrude.

With the discussed embodiment of the invention, a pin of predetermined length is always suitable for each and any display point located at the same place in the step configuration.

The invention preferably is executed as an extended braille cell with two rows of four tactile points. Consequently, it is possible to give, apart from the usual braille notation, additional information such as capitals, cyphers, musical notations and so on. Such information can also be displayed in six-points braille display cells by vibrating one or more tactile members, as is known from for instance U.S. Pat. No. 4,445,871. The invention allows the same procedure.

DETAILED DESCRIPTION OF THE PREFERRED EMBODIMENT

Figure 1:
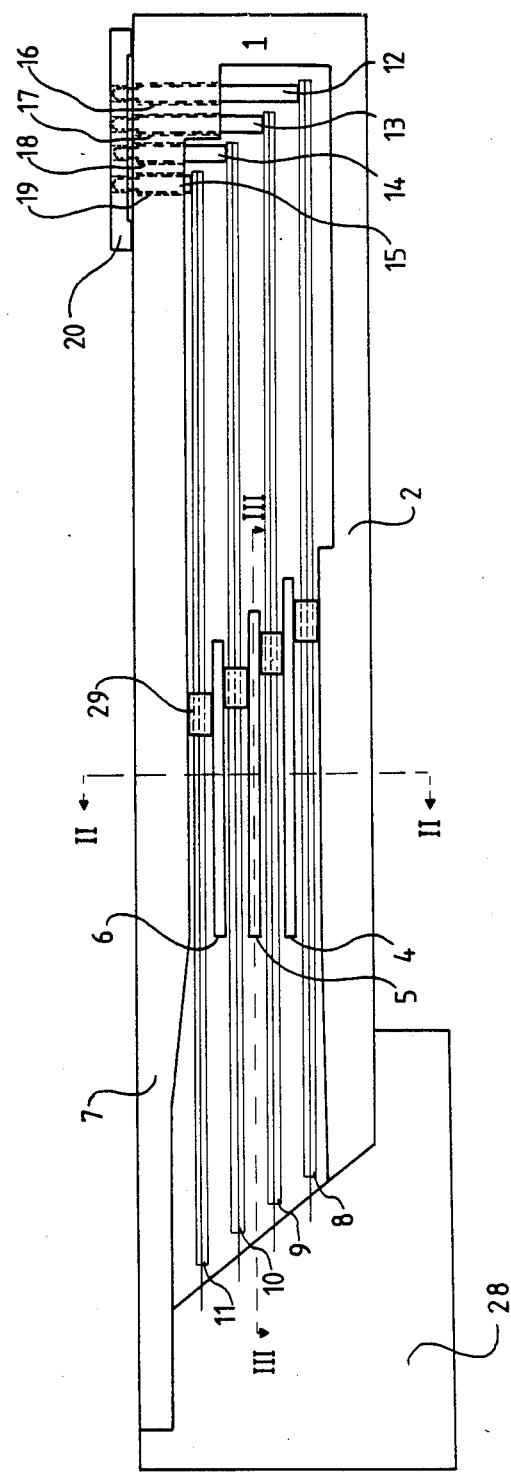
FIG. 1 schematically shows a side view of a braille cell in which the invention has been applied.
Figure 2:
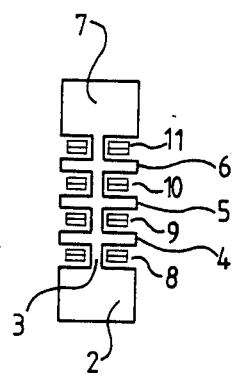
FIG. 2 is a cross section through the cell depicted in FIG. 1 along the line II—II.

In the drawings reference 1 indicates a frame with a lower beam 2, a central baffle 3 with both sides attached to it, protruding horizontal support baffles 4, 5 and 6, and an upper beam 7.

At both sides of baffle 3 in horizontally open interspaces are respective piezoelectric reeds 8, 9, 10 and 11. Reeds 8, 9, 10, and 11 are respectively mounted between the lower beam 2 and the first support baffle 4; between the first support baffle 4 and the second support baffle 5; between the second support baffle 5 and the third support baffle 6; and between the third support baffle 6 and the upper beam 7. Cooperating with these reeds are pins 12, 13, 14, and 15, which can freely move up and down in bores 16, 17, 18 and 19 made in the upper beam 7. On upper beam 7, a palping plate 20 has been mounted in a removable way having holes in the elongation of the holes 16, 17, 18 and 19. These pins 12, 13, 14 and 15 have a length adapted to the height of the reeds 8, 9, 10 or 11 with which they cooperate. Thus, if the associated reed flexes in a way known per se under influence of an electric voltage, a rounded head of the related pin protrudes at the upper side of the plate 20 and is thereby palpable. In this shown embodiment, there are two rows of four pins. This means that a braille display of a character or sign is possible with additional information such as an indiction for by cyphers, capitals, musical notation and the like.

Figure 5:
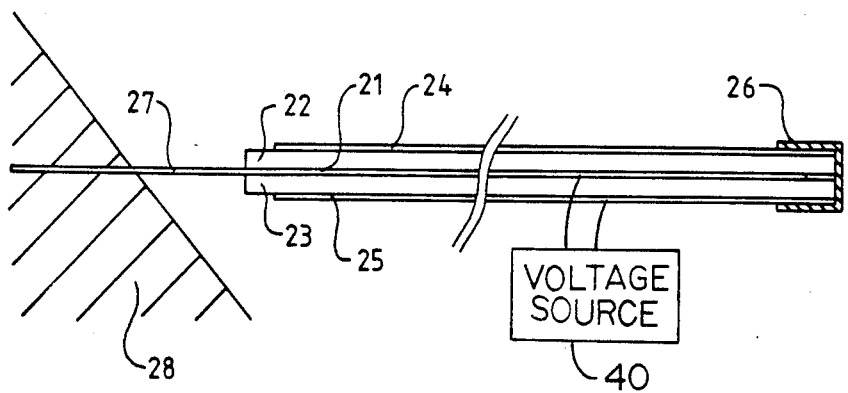
FIG. 5 shows a side view of a reed.

As more specifically shown in FIG. 5, the reeds 8, 9, 10 and 11 are formed by a thin central conducting leaf 21 of, for instance, brass. At both sides of leaf 21, a piezoelectric layer 22 and 23 respectively has been applied. On layers 22 and 23 there is a conducting layer 24 and 25 respectively, for instance of silver, nickel or gold.

As shown in FIG. 5, the conducting layers 24 and 25 end shortly before the attachment end of the reed. However, the central leaf 21 of conducting materials extends beyond the piezoelectric layers 22 and 23 by means of an extension 27.

At a braille end opposite extension 27, the central leaf 21 ends short of this end of the reed. Therefore, the conducting layers 24 and 25 can be connected with a connection member 26 without any danger of contact with leaf 21.

A voltage source 40 is provided to supply a central voltage to either central leaf 21 or the connected together conducting layers 24 and 25 and a second voltage to the other of central leaf 21 and conducting layers 24 and 25. The second voltage is selected from a predetermined voltage value above or an equal value below the central voltage.

At the other end of the reed, the extension 27 of the central leaf is sufficiently stiff to allow a stable attachment, for instance by means of soldering or welding, to a plate 28. Plate 28 may, for instance, be a print plate locally having conducting parts or webs 32.

Figure 4:
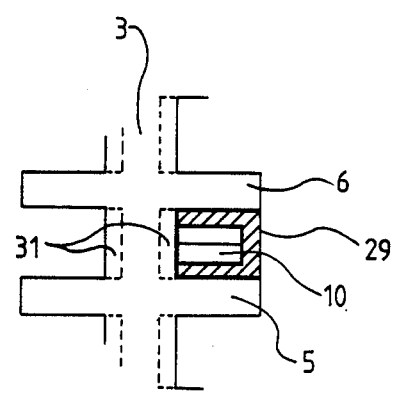
FIG. 4 shows a partial view on an enlarged scale of FIG. 2.
Figure 3:
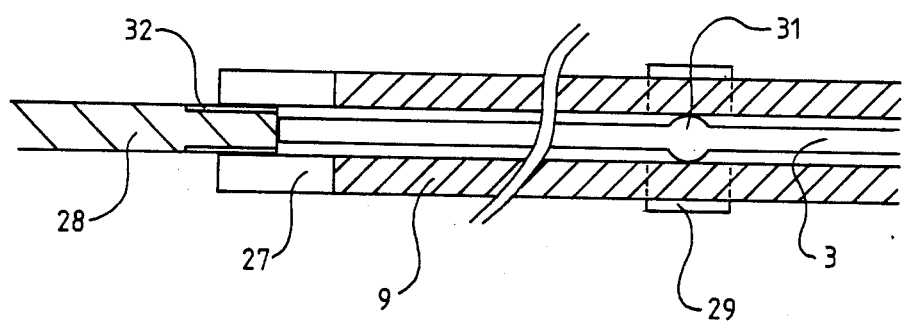
FIG. 3 shows a view, partly in cross section and on a larger scale along the line III—III of FIG. 1.
Figure 6:
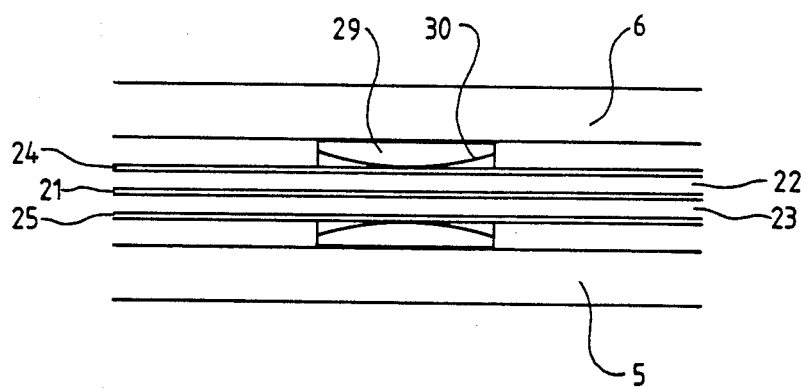
FIG. 6 shows on a larger scale the clamping of the reed.

FIGS. 4 and 6 show how the reed 10 is clamped between the support baffles 5 and 6 by means of a clip 29. Clip 29 has a U-shape, with plane outer surfaces engaging the baffles 5 and 6 respectively, and inner surfaces having a convex shape 30. This clip engages a round abutment part 31 (see FIGS. 3 and 4) applied to the central baffle 3 and serving the additional purpose to prevent the reeds 8-11 from engaging the central baffle 3.

The device shown in in the drawings is in fact a braille cell for only one character. A plurality of such cells can be juxtapositioned forming a braille display ruler.

However, the invention is not limited to applications for forming braille characters, but encompasses also devices for communicating arbitrary patterns to a blind or visual handicapped person.

Manufacturing the above described device can be realized by mounting it completely without attaching the extensions 27 of the central leafs 21 to the plate 28. The, gauge parts are inserted between the frame and in the drawing the right ends of the reeds, so the reeds take an exactly defined position irrespective of any reed curvature or imperfectness of the clamping means or clips 29.

In this position, the extensions 27 of the reeds are soldered or welded to plate 28 which results in an exact definition of the reed's ends cooperating with the pins 16-19, so that no further adjustment is needed. Consequently, the pins 16, 17, 18 and 19 each may have their own predetermined length. This allows for an important labour savings, because adjustments are rather time consuming. Moreover, the palping plate 20 with its reading surface can be cleaned by removing the pins and cleaning them separately without need to see to it that afterwards each individual pin is returned to its original position. This is an important advantage simplifying cleaning and/or service activities in a considerably extent.

The braille cell shown in the drawings has the advantage that a braille character is formed at the outer end. Thus, it is possible to position two cells with their braille ends against each other, after which such double cells may be arranged in a row to form two consecutive braille reading lines in close proximity.

We claim:

1. An electromechanical relief display device comprising:
   a frame;
   at least one tactile member provided in said frame which is movable between a first position and a second position such that by feeling for said tactile member a user determines in which position said tactile member is;
   an oblong piezoelectric flexion member which may be bent under the influence of voltages applied thereto; and
   a supporting means for supporting said flexion member on said frame at two separate locations such that a third separate location of said flexion member is coupled to said tactile member to move said tactile member between the two positions as said flexion member is bent, said third separate location being to one side of said first and second separate locations along said fixation member.

2. A display device as claimed in claim 1 wherein said first location is at one end of said flexion member, said second location is in a middle region of said flexion member, and said third location is at the other end of said flexion member.

3. A display device as claimed in claim 1 wherein said flexion members include a conducting central leaf, opposed conducing layers on each side of said central leaf and spaced therefrom, and an extension of said central leaf; and wherein said supporting means for said first location is an attachment of said extension to said frame, and said supporting means for said second location is a clamping member attached to said frame and between which said second location is clamped.

4. A display device as claied in claim 3 wherein said clamping member includes opposed clamping surface in contact with said flexion member, said clamping surfaces being convex shaped.

5. A display device as claimed in claim 1 wherein there are a plurality of said flexion members and a corresponding plurality of supporting means, said flexion members having the same length; and wherein said supporting means mounts said flexion members in a stepped pattern one above the other in a common bending plane with said first, second and third locations arranged in corresponding stepped patterns.

6. A display device as claimed in claim 5 wherein said flexion member includes a conducting part at said first location; wherein said frame includes a conducting web substantially parallel to the bending plane, and wherein said supporting means for the first location of said flexion members is a connection of said first location to said conducting web.

7. A display device as claimed in claim 6 wherein there are two sets of said flexion members mounted in a stepped pattern and with the sets located beside each other such that a space is provided between said extensions of said flexion members; and wherein said said frame includes a plate located in the space and a conducting web located on each side of said plate.

8. A display device as claimed in claim 6 wherein said supporting means for the second location includes a means for allowing each said reed to tilt thereabout in the bending plane prior to the connection of each said reed at the first location whereby each said reed is initially adjusted with respect to an associated said tactile member in the bending plane prior to the connection of each said reed at the first location.

9. A display device as claimed in claim 8 wherein said frame includes a tactile surface and holes in said tactile surface; and wherein said tactile members are pins having fixed lengths located on said holes.

10. A display device as claimed in claim 1 said flexion member includes a conducting central leaf, opposed conducting layers on each side of said central leaf and insulated therefrom, and an electrical connection between said conducting layers; and a voltage source having a central voltage connected to one of said central leaf and said conducting layers and a second voltage connected to the other of said central leaf and said conducting layers, said second voltage being selected from a predetermined voltage value above the central voltage and an equal voltage value below the central voltage.

* * * * *